United States Patent [19]

Kita et al.

[11] Patent Number: 4,690,506
[45] Date of Patent: Sep. 1, 1987

[54] METHOD OF PRODUCING VARIED LINE-SPACE DIFFRACTION GRATINGS

[75] Inventors: Toshiaki Kita, Nishitama; Tatsuo Harada, Fuchu, both of Japan

[73] Assignee: Hitachi, Ltd., Tokyo, Japan

[21] Appl. No.: 783,363

[22] Filed: Oct. 3, 1985

[30] Foreign Application Priority Data

Oct. 3, 1984 [JP] Japan .................. 59-206278

[51] Int. Cl.$^4$ .................... G02B 5/18; B43L 13/24
[52] U.S. Cl. .................... 350/320; 33/19.2; 33/32.1; 33/32.3
[58] Field of Search ........ 350/320; 33/19.1, 19.2, 33/32.1, 32.3

[56] References Cited

U.S. PATENT DOCUMENTS 4,012,843  3/1977  Harada et al. .................. 33/19.2

Primary Examiner—Bruce Y. Arnold
Attorney, Agent, or Firm—Antonelli, Terry & Wands

[57] ABSTRACT

In a method of producing diffraction gratings by feeding either one of a blank or a groove-ruling tool by an amount consisting of the amount of constant transference and the amount of variable transference that is added thereto, or subtracted therefrom, while reciprocally moving the other one of said blank or said groove-ruling tool, in order to rule grooves of irregular intervals on said blank, a method of producing varied line-space diffraction gratings wherein the region of ruling is divided into a plurality of small regions so that the difference between a maximum value and a minimum value of distance between grooves becomes smaller than a predetermined value, and the amount of constant transference is set to the nearly equal to an average distance between grooves in each of said small regions.

4 Claims, 4 Drawing Figures

METHOD OF PRODUCING VARIED LINE-SPACE DIFFRACTION GRATINGS

BACKGROUND OF THE INVENTION

The present invention relates to a method of mechanically producing diffraction gratings having grooves of varied line space, and particularly to a method of producing diffraction gratings in which the distance between grooves is changed continuously and greatly.

Nearly two hundred years have passed since the diffraction grating was first invented, and performance was improved strikingly. However, groove spacing of an equal distance have long been inherited irrespective of whether it is a plane diffraction grating or a concave diffraction grating.

In recent years, however, it has been proposed to arrange the grooves at irregular distances instead of arranging the grooves at equal invervals. That is, by arranging the grooves at irregular intervals on the concave diffraction grating, there have been proposed a variety of so-called aberration-corrected diffraction gratings having little or no aberration in the spectral image. So far, the plane diffraction grating did not have a light focusing property, and the cylindrical diffraction grating did not, either, have a light focusing property on a plane that includes a cylindrical axis. Recently, however, there have also been proposed plane diffraction gratings and cylindrical diffraction gratings having dispersing and focusing properties as a result of arranging the grooves at irregular intervals.

The aberration-corrected concave diffraction gratings have heretofore been produced by a method which is based upon the holography technology and by a mechanical method. However, the methods of producing aberration-corrected concave diffraction gratings are not applicable to the production of plane diffraction gratings having a focusing property or to the production of cylindrical diffraction gratings having focusing property.

According to the method based upon the holography technology, darkness and brightness of interference fringes by the recording laser beam are converted into rugged patterns of a photosensitive emulsion or a photosensitive resin, and a thin metal film is formed on the surface by vacuum evaporation or the like. In this method, limitation is imposed on the position of the source of recording laser beam and on the wavelength of the beam, making it difficult to impart a desired focusing property to the plane diffraction grating or the cylindrical diffraction grating. In particular, the diffraction gratings of this kind are usually used in a soft X-ray region through up to a vacuum ultraviolet region where strict limitations are required concerning the position of the source of recording laser beam and the wavelength of the beam. Therefore, it is virtually difficult to produce the diffraction gratings relying upon the holography technology.

Described below are a conventional method of mechanically producing the aberration-corrected concave diffraction grating and an apparatus therefor in conjunction with FIG. 1. Such a method has been taught, for example, in Japanese Patent Publication No. 33562/1982. In FIG. 1, the rotational force of a main motor 1 is transmitted to a worm reduction gear 3 via a belt 2. The rotational force is then transmitted to a tool reciprocating link device 4 which causes a tool carriage 5 to reciprocate, the tool carriage 5 being equipped with a groove-ruling tool. Rotational force of the worm reduction gear 3 is further transmitted to a feed screw 8 via a speed change gear 6 and a differential gear 7. A switch 9 is closed after every completion of a ruling, whereby a pulse motor 10 is turned by a predetermined angle, and the rotational force is transmitted to the feed screw 8 via the differential gear 7. A blank carriage 12 mounting a blank 11 is moved depending upon the rotational angle of the feed screw 8. While the tool is ruling the blank 11, the blank carriage 12 and the blank 11 are moved at a speed corresponding to a rotational speed determined by the speed change gear 6. During the period of from the completion of ruling by the tool to the next start of ruling, the blank carriage 12 and the blank 11 are moved by an amount consisting of a feeding amount (the amount of constant transference) corresponding to the rotational speed determined by the speed change gear 6 and a feeding amount (the amount of variable transference) corresponding to the number of pulses generated by a pulse generator 13, which is added thereto or is subtracted therefrom. Therefore, the grooves can be ruled at desired irregular intervals by controlling the number of pulses generated from the pulse generator 13 by a computer 14. The pulse generator 13 produces a predetermined number of pulses responsive to the instruction from the computer 14 after each opening and closing of the switch 9. The pulse motor 10 is turned by a rotational angle corresponding to the number of pulses generated from the pulse generator 13, and the rotational force is transmitted to the differential gear 7.

Here, the amount of variable transference is the product of a feeding amount of the blank 11 per unit pulse and the number of pulses. When the pulse motor 10 is used as a source for driving the blank 11 by unequal distances, the distance between grooves changes discretely strictly speaking. Usually, however, the blank 11 is fed by an amount of as small as 0.2 angstrom per unit pulse, so that the distance between grooves will virtually appear to change continuously. There has been realized a pulse motor which operates at a maximum drive frequency of about 10 kHz. If the pulse motor 10 is rotated at such a high speed, however, the rotational speed of a rotation transmission system subsequent to the differential gear 7 changes abruptly when the pulse motor 10 is started or stopped, and it becomes very difficult to properly feed the blank 11. To properly feed the blank 11, therefore, a maximum drive frequency for the pulse motor 10 must be limited to about 500 Hz. Further, the time in which the pulse motor 10 is allowed to turn is shorter than one-half the reciprocating period of the tool. Usually, the period for reciprocating the tool is about 6 seconds. Therefore, the time in which the pulse motor 10 is allowed to turn is about 3 seconds at the greatest. From the above fact, a maximum amount of variable transference is $0.2 \times 10^{-4} \times 500 \times 3 = 0.03$ μm.

Here, the object of the concave diffraction grating having groove spacing of irregular intervals is to correct the aberration. Therefore, the difference between the distance among grooves and the average distance of grooves is usually very small, i.e., the change of distance is very small, and the difference seldom exceeds 0.03 μm at the greatest. Accordingly, the aberration-corrected concave diffraction grating can be sufficiently manufactured by the aforementioned conventional method. However, the object of the plane diffraction grating and the cylindrical diffraction grating having groove spacing of irregular intervals, are to exhibit the focusing property that had not hitherto been provided. In this case, therefore, the change of distance of grooves becomes inevitably large and a maximum value thereof greatly exceeds 0.03 μm as will be mentioned later. Therefore, the conventional method tailored to producing the concave diffraction gratings is not virtually effective to produce the desired plane diffraction gratings or the cylindrical diffraction gratings. Even with the concave diffraction grating, it is difficult to perform the ruling by the conventional method if a maximum change of distance between grooves exceeds 0.03 μm.

As described above, neither the method based upon the holography technology nor the mechanical method is effective for producing diffraction gratings having groove spacing of irregular intervals in which the distance between grooves vary greatly, such as the plane diffraction gratings and cylindrical diffraction gratings having focusing function.

SUMMARY OF THE INVENTION

The present invention was accomplished in order to solve the above-mentioned problems, and its object is to provide a method of producing varied line-space diffraction gratings in which the distance between grooves is greatly changed.

To achieve the above object, the present invention deals with a method of producing diffraction gratings by feeding either one of a blank or a groove-ruling tool by an amount consisting of the amount of constant transference and the amount of variable transference that is added thereto, or subtracted therefrom, while reciprocally moving the other one of said blank or said groove-ruling tool, in order to rule grooves of irregular intervals on said blank, wherein the region of ruling is divided into a plurality of small regions so that the difference between a maximum value and a minimum value of distance between grooves becomes smaller than a predetermined value, and the amount of constant transference is set to be nearly equal to an average distance between grooves in each of said small regions.

DESCRIPTION OF THE PREFERRED EMBODIMENT

Figure 1:
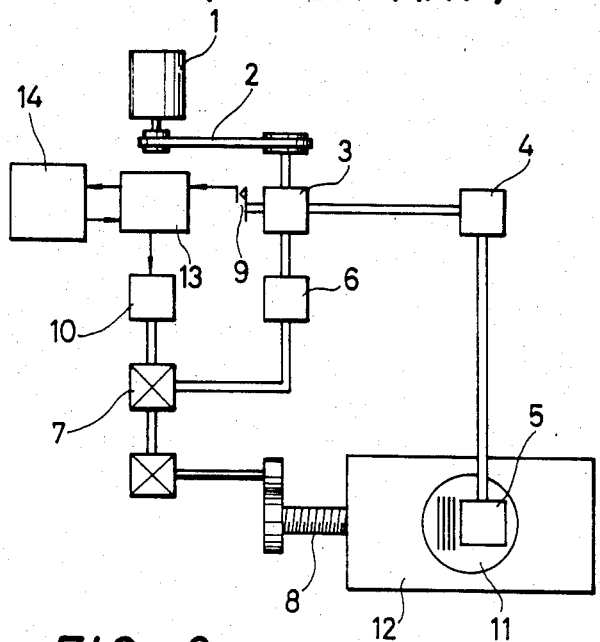
FIG. 1 is a diagram showing a conventional method and an apparatus for mechanically producing aberration-corrected concave diffraction gratings.
Figure 2:
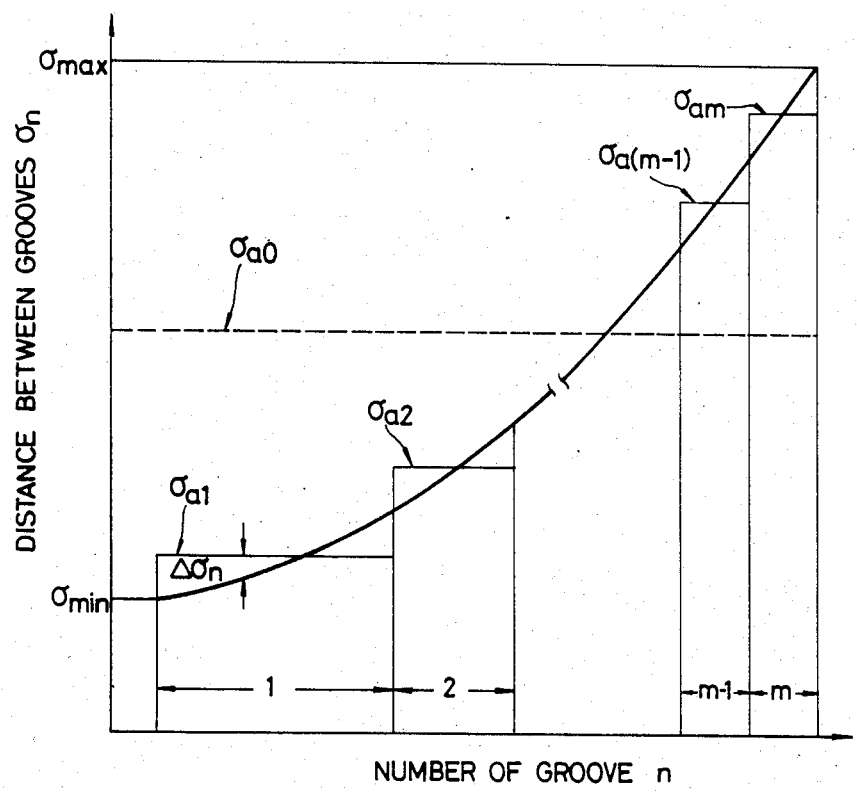
FIG. 2 is a diagram for explaining the principle of the present invention.

FIG. 2 is a diagram explaining the principle of the present invention, wherein the abscissa represents a groove number n and the ordinate represents the distance $\sigma_n$ between grooves. Considered below is the case where the diffraction grating is ruled while changing the distance $\sigma_n$ between grooves from a minimum value $\sigma_{min}$ to a maximum value $\sigma_{max}$ as represented by a curve in FIG. 2.

Here, the region of ruling is divided in the direction of groove number n so that the difference between a maximum value and a minimum value of the distance $\sigma_n$ between grooves becomes smaller than, for example, 0.06 μm in each of the small regions that are denoted by 1, 2, . . . m and average distances between grooves in each of the small regions are denoted by $\sigma_{a1}$, $\sigma_{a2}$, . . . $\sigma_{am}$. Then, the change of distance $\Delta\sigma_n$ between grooves is $\sigma_n - \sigma_{a1}$ in the region 1, $\sigma_n - \sigma_{a2}$ in the region 2, . . . and $\sigma_n - \sigma_{am}$ in the region m. In this case, a maximum value of $\Delta\sigma_n$ is smaller than 0.03 μm. Therefore, if the small region 1 is ruled with the amount of constant transference being set to the average distance $\sigma_{a1}$, the amount of variable transference does not exceed 0.03 μm. Similarly, if the small regions 2, . . . m are ruled with the amount of constant transference being set to average distances $\sigma_{a2}$, . . . $\sigma_{am}$, the amount of variable transference can be confined with 0.03 μm. Thus, the grooves can be ruled without increasing the amount of variable transference even when the distance between grooves changes greatly, i.e., even when the value $\sigma_{max} - \sigma_{min}$ is great.

Figure 3:
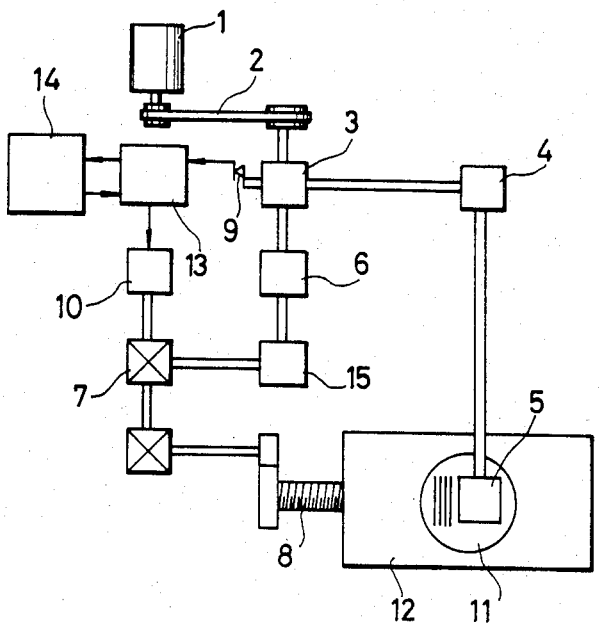
FIG. 3 is a diagram showing a method and an apparatus for producing varied line-space diffraction gratings according to an embodiment of the present invention.

FIG. 3 is a diagram showing an apparatus for putting into practice the method of producing varied line-space gratings according to the present invention. In this apparatus, a speed change gear 15 is provided between the speed change gear 6 and the differential gear 7. By changing the speed change ratio of the speed change gear 15, therefore, the feeding amount corresponding to an average distance among grooves of the whole diffraction grating set by the speed change gear 6 can be varied into any value at any moment prior to starting the ruling on the diffraction grating or after the ruling has been started.

Figure 4:
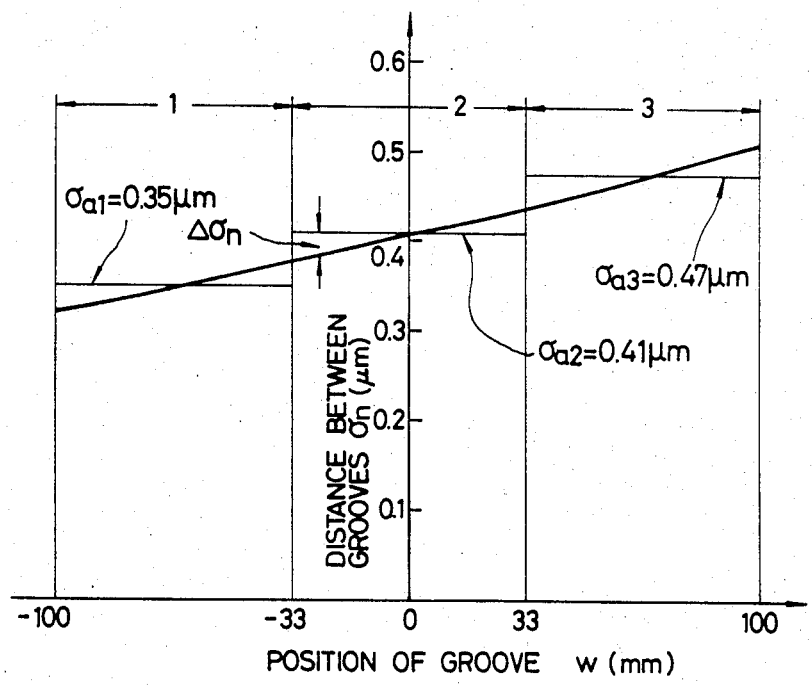
FIG. 4 is a graph showing a relation between the position of groove and the distance between grooves of a varied line-space plane diffraction grating produced according to the present invention.

Described below is the method of producing a plane diffraction grating using the apparatus of FIG. 3. FIG. 4 is a graph showing a relation between the position w of groove and the distance $\sigma_n$ between grooves of the plane diffraction grating in which the distance $\sigma_n$ between grooves changes nearly linearly from $\sigma_{min} \approx 0.32$μm to $\sigma_{max} \approx 0.51$, with $\sigma_{max} - \sigma_{min} = 0.19$ μm. Here, the region of ruling is divided into three small regions as shown in FIG. 4, i.e., divided into a region 1 ($-100\text{mm} \leq w < -33\text{mm}$), a region 2 ($-33\text{mm} \leq w \leq 33\text{mm}$), and a region 3 ($33\text{mm} < w \leq 100$ mm). A speed change ratio of the speed change gear 6 is so set that the amount of constant transference is 0.41 μm which is close to the average distance among the grooves of the whole diffraction grating when the speed change ratio of the speed change gear 15 is 1. Next, the speed change ratio of the speed change gear 15 is so set that the amount of constant transference becomes equal to the average distance $\sigma_{a1} = 0.35$ μm of the small region 1, and the number of pulses generated from the pulse generator 13 is so controlled that the amount of variable transference becomes equal to a change of distance between the grooves $\Delta\sigma_n = \sigma_n - \sigma_{a1}$, thereby to rule the small region 1. When the ruling of the small region 1 is finished, the speed change ratio of the speed change gear 15 is set to 1, i.e., the amount of constant transference is set to be equal to the average distance $\sigma_{a2} = 0.41$ μm of the small region 2, and the number of pulses generated by the pulse generator 13 is so controlled that the amount of variable transference becomes equal to a change of distance between the grooves $\Delta\sigma_n = \sigma_n - \sigma_{a2}$, thereby to rule the small region 2. When the ruling of the small region 2 is finished, the speed change ratio of the speed change gear 15 is so set that the amount of constant transference becomes equal to the average distance $\sigma_{a3}=0.47$ μm of the small region 3, and the number of pulses generated by the pulse generator 13 is so controlled that the amount of variable transference becomes equal to a change of distance $\Delta\sigma_n=\sigma_n-\sigma_{a3}$, thereby to rule the small region 3. The above-mentioned method makes it possible to produce a plane diffraction grating having groove spacing at desired irregular intervals in which the distance $\sigma_n$ between grooves changes continuously from a minimum value of $\sigma_{min}=0.32$ μm to a maximum value of $\sigma_{max}=0.51$, and hence to realize a novel monochromator for synchrotron radiation.

In the above-mentioned embodiment, the speed change gear 6 that determines the feeding amount corresponding to an average distance of grooves of the whole diffraction grating and the speed change gear 15 that sets the amount of constant transference to become equal to an average distance of each small region, are combined in cascade. However, the same effects can also be obtained even when the speed change gears 6, 15 are combined as a unitary structure to change the speed change ratio for each of the small regions. Further, the above embodiment has dealt with the case where the groove-ruling tool is reciprocally moved while feeding the blank 11. As a matter of course, however, the method of the present invention can also be adapted even when the blank 11 is reciprocally moved while feeding the groove-ruling tool.

According to the method of producing varied line-space diffraction gratings of the present invention as described above, it is possible to produce varied line-space diffraction gratings having greatly varying distance between grooves, such as plane diffraction gratings and cylindrical diffraction gratings having dispersing and focusing properties. As described above, the present invention offers remarkable effects.

What is claimed is:

1. In a method of producing diffraction gratings by feeding either one of a blank or a groove-ruling tool by an amount consisting of the amount of constant transference and the amount of variable transference that is added thereto, or subtracted therefrom, while reciprocally moving the other one of said blank or said groove-ruling tool, in order to rule grooves of irregular intervals on said blank, a method of producing varied line-space diffraction gratings wherein the region of ruling is divided into a plurality of small regions so that the difference between a maximum value and a minimum value of distance between grooves becomes smaller than a predetermined value, and the amount of constant transference is set to be nearly equal to an average distance between grooves in each of said small regions.

2. A method of producing varied line-space diffraction gratings according to claim 1, wherein said amount of constant transference and said amount of variable transference are determined by speed change gears.

3. A method of producing varied line-space diffraction gratings according to claim 1, wherein the groove-ruling tool is reciprocally moved while feeding said blank.

4. A method of producing varied line-space diffraction gratings according to claim 1, wherein said blank is reciprocally moved while feeding said groove-ruling tool.

* * * * *